(12) United States Patent
Yang et al.

(10) Patent No.: US 8,710,362 B2
(45) Date of Patent: Apr. 29, 2014

(54) PHOTOELECTRIC CONVERSION DEVICE

(75) Inventors: Nam-Choul Yang, Suwon-si (KR); Ji-Won Lee, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 341 days.

(21) Appl. No.: 12/781,123

(22) Filed: May 17, 2010

(65) Prior Publication Data

US 2011/0155224 A1 Jun. 30, 2011

(30) Foreign Application Priority Data

Dec. 28, 2009 (KR) .......................... 10-2009-0131803

(51) Int. Cl.
*H01L 31/00* (2006.01)
*H01G 9/20* (2006.01)

(52) U.S. Cl.
CPC .............. *H01G 9/2077* (2013.01); *Y02E 10/542* (2013.01)
USPC .......................................... 136/263; 349/154

(58) Field of Classification Search
CPC . H01G 9/2077; H01G 9/2004; H01G 9/2022; H01G 9/2031; H01G 9/2036; H01G 9/204; H01G 9/2068; H01G 9/2081; H01G 9/2095; H01M 2/08; H01L 51/5246; H01L 51/5237; H01L 51/524; H01L 51/5243; H01L 51/5259; H01L 51/422; H01L 51/4226; H01L 51/4233; H01L 51/441; H01L 51/445; H01L 51/448; G02F 1/1339; G02F 1/13394; G02F 1/1341
USPC .......... 136/243–265; 359/265, 267, 275, 272; 349/84, 190, 153–155; 425/25; 429/185, 163, 171
See application file for complete search history.

(56) References Cited

U.S. PATENT DOCUMENTS

| 4,227,779 A | 10/1980 | Bissar et al. |
| 6,425,792 B1 * | 7/2002 | Toya et al. ........................ 445/25 |

(Continued)

FOREIGN PATENT DOCUMENTS

| JP | 2007-59181 | 3/2007 |
| JP | 2007059181 A * | 3/2007 |

(Continued)

OTHER PUBLICATIONS

"Shin-Etsu silicone: Characteristic properties of silicone rubber compounds," Published by Shin-Etsu Chemical Co., Ltd. (2012). [retrieved from internet at http://www.shinetsu.com.cn/images/download/rubber%E6%B7%B7%E7%82%BC%E7%A1%85% E6%A9%A1%E8%83%B6%E7%9A%84%E7%89%B9%E6% 80%A7_e.pdf on Jan. 8, 2013].*

(Continued)

*Primary Examiner* — Jeffrey T Barton
*Assistant Examiner* — Eric R Smith
(74) *Attorney, Agent, or Firm* — Robert E. Bushnell, Esq.

(57) ABSTRACT

A photoelectric conversion device that includes a first substrate and a second substrate facing each other and having a space between the first substrate and the second substrate, a first electrode being arranged on the first substrate, a second electrode being arranged on the second substrate, an electrolyte arranged within the space between the first substrate and the second substrate, an electrolyte injecting aperture arranged on the first substrate to inject said electrolyte into said space and a sealing structure to seal the electrolyte injecting aperture, the sealing structure includes a water vapor absorption material to absorb water.

18 Claims, 10 Drawing Sheets

(56) References Cited

U.S. PATENT DOCUMENTS

| | | | |
|---|---|---|---|
| 2003/0056821 A1* | 3/2003 | Chittibabu et al. | 136/250 |
| 2003/0079772 A1* | 5/2003 | Gittings et al. | 136/251 |
| 2004/0161666 A1 | 8/2004 | Hass et al. | |
| 2004/0238026 A1* | 12/2004 | Miyoshi | 136/263 |
| 2005/0072458 A1* | 4/2005 | Goldstein | 136/251 |
| 2005/0079413 A1 | 4/2005 | Schubert | |
| 2006/0016473 A1* | 1/2006 | Choi et al. | 136/263 |
| 2006/0275657 A1 | 12/2006 | Kozuki et al. | |
| 2007/0204906 A1 | 9/2007 | Abe et al. | |
| 2009/0114272 A1* | 5/2009 | Inoue et al. | 136/252 |
| 2010/0003583 A1 | 1/2010 | Seong et al. | |
| 2010/0059113 A1* | 3/2010 | Hasegawa et al. | 136/256 |

FOREIGN PATENT DOCUMENTS

| | | |
|---|---|---|
| JP | 2008-117698 | 5/2008 |
| JP | 2008-226552 | 9/2008 |
| JP | 2008226552 A * | 9/2008 |
| KR | 1020070050906 A | 5/2007 |
| WO | WO 2008056545 A1 * | 5/2008 |

OTHER PUBLICATIONS

"Three Bond technical news: Main seal adhesive for liquid crystal," published by Three Bond Co., Ltd., Jul. 1, 1997. [retrieved from internet at www.threebond.co.uk/Portals/0/tech49.pdf on Jan. 8, 2013].*

"CRC handbook of chemistry and physics," ed. By R. C. Weast, p. E-37, published by CRC Press (1984).*

Machine translation of JP2007059181A.*

Korean Office Action issued by KIPO, dated Mar. 28, 2011, corresponding to Korea Patent Application No. 10-2009-0131803, together with Request for Entry.

* cited by examiner

PHOTOELECTRIC CONVERSION DEVICE

CLAIM OF PRIORITY

This application makes reference to, incorporates the same herein, and claims all benefits accruing under 35 U.S.C. §119 from an application earlier filed in the Korean Intellectual Property Office on 28 Dec. 2009 and there duly assigned Serial No. 10-2009-0131803.

BACKGROUND OF THE INVENTION

1. Field of the Invention

One or more embodiments of the present invention relate to a photoelectric conversion device, and more particularly, to a photoelectric conversion device having excellent durability.

2. Description of the Related Art

Extensive research has recently been conducted on photoelectric conversion devices that convert light into electric energy. From among such devices, solar cells have attracted much attention as alternative energy sources to fossil fuels.

As research on solar cells having various working principles has been continuously conducted, wafer-based crystalline silicon solar cells using a p-n semiconductor junction have appeared to be the most prevalent ones. However, the manufacturing costs of wafer-based crystalline silicon solar cells are high because they are made out of a high purity semiconductor material.

Unlike silicon solar cells, dye-sensitized solar cells include a photosensitive dye that receives visible light and generates excited electrons, a semiconductor material that receives the excited electrons, and an electrolyte that reacts with electrons returning from an external circuit. Since dye-sensitized solar cells have much higher photoelectric conversion efficiency than other conventional solar cells, the dye-sensitized solar cells are viewed as the next generation solar cells.

SUMMARY OF THE INVENTION

One or more embodiments of the present invention include a photoelectric conversion device having excellent durability.

Additional aspects will be set forth in part in the description which follows and, in part, will be apparent from the description, or may be learned by practice of the presented embodiments.

According to one aspect of the present invention, there is provided a photoelectric conversion device includes a first substrate and a second substrate facing each other and having a space between the first substrate and the second substrate, a first electrode being arranged on the first substrate, a second electrode being arranged on the second substrate, an electrolyte arranged within the space between the first substrate and the second substrate, an electrolyte injecting aperture arranged on the first substrate to inject said electrolyte into said space and a sealing structure to seal the electrolyte injecting aperture, the sealing structure includes a water vapor absorption material to absorb water.

The sealing structure may also include a filler to fill the electrolyte injecting aperture in a thickness direction of the first substrate. The filler may extend from the electrolyte injecting aperture into the space between the first substrate and the second substrate. The filler may have a rivet shaped cross-section. The sealing structure may also include a resin base material to contain the water vapor absorption material. The water vapor absorption material can include at least one of a physical adsorption drying agent and a chemical adsorption drying agent. The resin base material may have mobility in a temperature range of 80° C. to 180° C.

The sealing structure may also include first and second fillers that are respectively comprised of different materials, the first and second fillers fill upper and lower portions respectively of the electrolyte injecting aperture in a thickness direction of the first substrate. The first filler may also include a resin base material that contains the water vapor absorption material. The second filler may extend from the lower portion of the electrolyte injecting aperture into the space between the first and second substrates. The second filler may have a rivet shaped cross-section.

The photoelectric conversion device may also include a cap member attached to the first substrate and covering an upper portion of the electrolyte injecting aperture. The sealing structure may also include a sealing layer arranged on the first substrate and covering the upper portion of the electrolyte injecting aperture. The photoelectric conversion device may also include a contacting layer arranged between the cap member and the sealing layer to attach the cap member to the sealing layer. The contacting layer may be arranged over a region on the first substrate that covers and surrounds the sealing layer. The sealing structure may also include a filler to fill the electrolyte injecting aperture in a thickness direction of the first substrate and a sealing layer covering an upper portion of the electrolyte injecting aperture. At least one of the filler and the sealing layer may include the water vapor absorption material.

According to another aspect of the present invention, there is provided a photoelectric conversion device that includes a light receiving substrate having a photoelectrode arranged thereon, a counter substrate facing the light receiving substrate, a counter electrode being arranged on the counter substrate, an electrolyte arranged in a space between the light receiving substrate and the counter substrate, an electrolyte injecting aperture arranged in a thickness direction of the light receiving substrate to inject said electrolyte and a water-absorbing filler arranged within the electrolyte injecting aperture to seal the electrolyte within the space between the light receiving substrate and the counter substrate, wherein the water-absorbing filler includes a water vapor absorption material to absorb water and a resin base material that contains the water vapor absorption material. The water-absorbing filler may extend from the electrolyte injecting aperture into the space between the light receiving substrate and the counter substrate.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
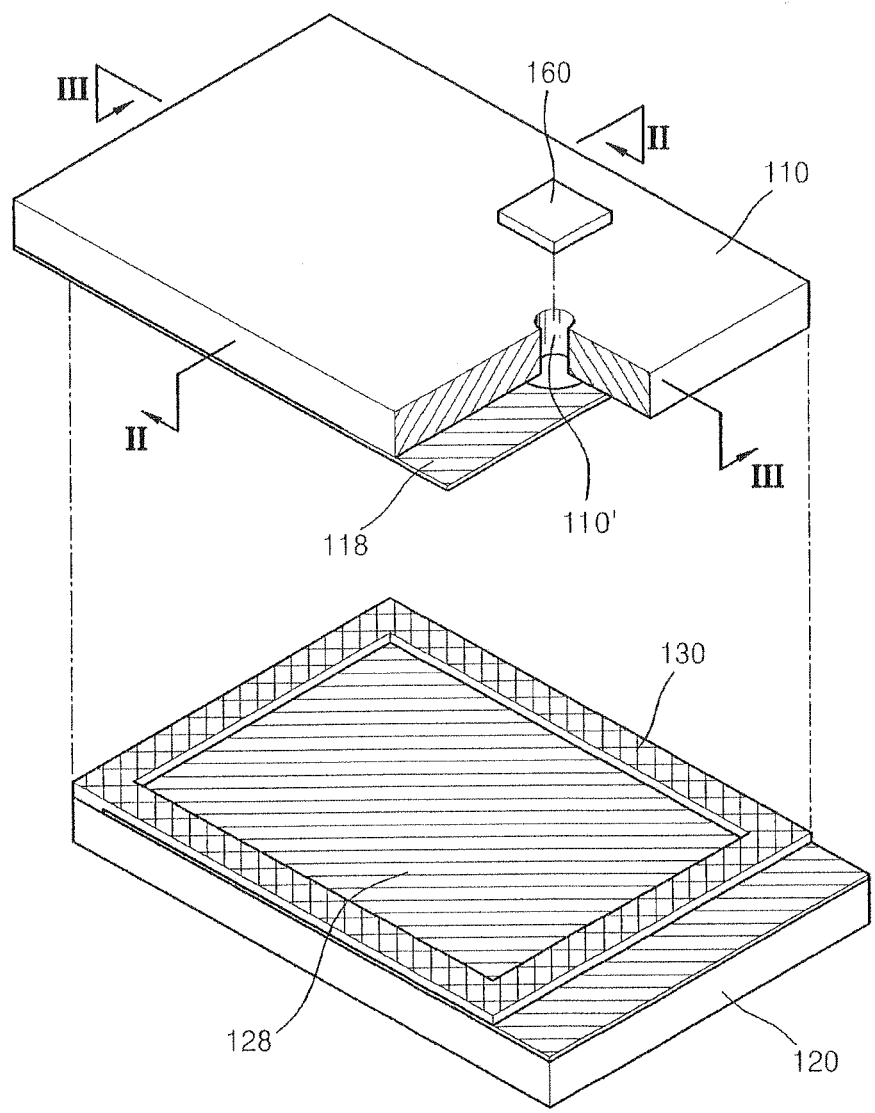
FIG. 1 is an exploded perspective view illustrating a photoelectric conversion device according to a first embodiment of the present invention.

One or more embodiments of the present invention will now be described with reference to the attached drawings. Turning to FIG. 1, FIG. 1 is an exploded perspective view illustrating a photoelectric conversion device according to a first embodiment of the present invention. Referring to FIG. 1, a light receiving substrate 110 on which a functional layer 118 is arranged and a counter substrate 120 on which a functional layer 128 is arranged face each other. A sealing member 130 is arranged along edges of the light receiving substrate 110 and the counter substrate 120 so as to attach the light receiving substrate 110 to the counter substrate 120. Then, an electrolyte (not shown) is injected through an electrolyte injecting aperture 110' formed in the light receiving substrate 110. The sealing member 130 seals the electrolyte within so that the electrolyte does not leak to the outside.

The functional layers 118 and 128 respectively arranged on the light receiving substrate 110 and the counter substrate 120 include a semiconductor layer for generating electrons when irradiated by light and electrodes for collecting and discharging the generated electrons. In addition, an end of the electrode consisting of the functional layers 118 and 128 may extend to the outside of the sealing member 130 toward the outside to electrically contact with an external circuit (not shown).

Figure 2A:
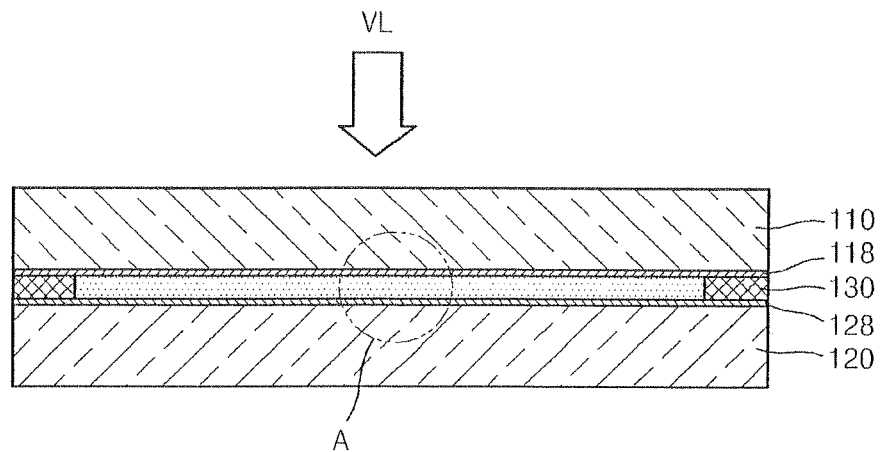
FIG. 2A is a cross-sectional view taken along a line II-II of FIG. 1.
Figure 2B:
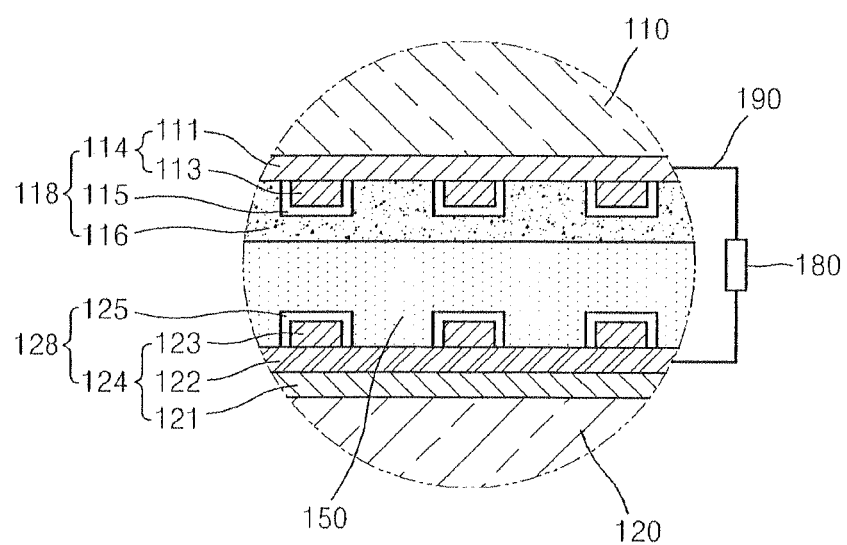
FIG. 2B is an enlarged view of part A of FIG. 2A.

Turning now to FIGS. 2A and 2B, FIG. 2A is a cross-sectional view taken along a line II-II of FIG. 1 and FIG. 2B is an enlarged view of part A of FIG. 2A. Referring to FIG. 2B, the light receiving substrate 110 on which a photoelectrode 114 is arranged, and the counter substrate 120 on which a counter electrode 124 is arranged face each other. A semiconductor layer 116 absorbing a photosensitive dye that is excited by light VL is arranged on photoelectrode 114. An electrolyte 150 is arranged between the semiconductor layer 116 and the counter electrode 124. For example, the photoelectrode 114 and the semiconductor layer 116 correspond to the functional layer 118 adjacent to the light receiving substrate 110, and counter electrode 124 corresponds to the functional layer 128 adjacent to the counter substrate 120.

The light receiving substrate 110 and the counter substrate 120 are attached to each other using sealing member 130 so that a predetermined interval is arranged therebetween. The sealing member 130 is arranged to surround and seal the electrolyte 150 within so that the electrolyte 150 does not leak to the outside. The sealing member 130 may be a thermal fusion film that cures upon the application of heat and pressure The photoelectrode 114 and the counter electrode 124 are electrically connected to each other using a wire 190 and an external circuit 180. In a module in which a plurality of photoelectric conversion devices are connected in series or in parallel, the photoelectrode 114 and the counter electrode 124 of the photoelectric conversion device may be connected to each other in series or in parallel, and both ends of connected portions may be connected to the external circuit 180.

The light receiving substrate 110 may be made out of a transparent material, for example, a material having a high light transmittance. For example, the light receiving substrate 110 may be a glass substrate or a resin film substrate. Since a resin film is usually flexible, the resin film may be applied to devices requiring flexibility.

The photoelectrode 114 may include a transparent conductive layer 111 and a grid electrode 113 arranged on the transparent conductive layer 111. The transparent conductive layer 111 may be made out of a material having transparency and electrical conductivity, for example a transparent conducting oxide (TCO) such as indium tin oxide (ITO), fluorine tin oxide (FTO), or antimony-doped tin oxide (ATO). The grid electrode 113 is used to reduce the electrical resistance of the photoelectrode 114, and functions as a wire that collects electrons generated by photoelectric conversion and provides a current path having a low resistance. For example, the grid electrode 113 may be made out of a metal material having a high electrical conductivity, such as gold (Ag), silver (Au), or aluminum (Al), and may be patterned in a stripe pattern.

The photoelectrode 114 functions as a negative electrode of the photoelectric conversion device and may have a high aperture ratio. Since light VL incident through the photoelectrode 114 excites the photosensitive dye absorbed into the semiconductor layer 116, the photoelectric conversion efficiency may be improved by increasing the amount of incident light VL.

A protective layer 115 may be further arranged on an outer surface of the grid electrode 113. The protective layer 115 prevents the grid electrode 113 from being damaged by erosion if the grid electrode 113 were to contact and react with the electrolyte 150. The protective layer 115 may be made out of a material that does not react with the electrolyte 150, such as a curable resin material.

The semiconductor layer 116 may be made out of a general semiconductor material, for example a metal oxide where the metal is cadmium (Cd), zinc (Zn), indium (In), lead (Pb), molybdenum (Mo), tungsten (W), antimony (Sb), titanium (Ti), silver (Ag), manganese (Mn), tin (Sn), zirconium (Zr), strontium (Sr), gallium (Ga), silicon (Si), or chromium (Cr). The semiconductor layer 116 may increase the photoelectric conversion efficiency by absorbing the photosensitive dye. For example, the semiconductor layer 116 may be formed by coating a paste of semiconductor particles having a particle diameter of 5 to 1000 nm on the light receiving substrate 110 on which the photoelectrode 114 is arranged and applying heat and pressure to a resultant structure.

The photosensitive dye absorbed into the semiconductor layer 116 absorbs light VL passing through the light receiving substrate 110, so that electrons of the photosensitive dye are excited from a ground state. The excited electrons are transferred to a conduction band of the semiconductor layer 116 through electrical contact between the photosensitive dye and the semiconductor layer 116, and are discharged to the outside through the photoelectrode 114, thereby forming a driving current for driving the external circuit 180.

For example, the photosensitive dye absorbed into the semiconductor layer 116 may absorb light VL and excite electrons so as to allow the excited electrons to be rapidly moved to the semiconductor layer 116 and the photoelectrode 114. The photosensitive dye may be any one of liquid type, semi-solid type, and solid type photosensitive dyes. For example, the photosensitive dye absorbed into the semiconductor layer 116 may be a ruthenium-based photosensitive dye. The semiconductor layer 116 absorbing the photosensitive dye may be obtained by dipping the light receiving substrate 110 on which the semiconductor layer 116 is arranged into a solution that includes the photosensitive dye.

The electrolyte 150 may be made out of a redox electrolyte including reduced/oxidized (R/O) couples. The electrolyte 150 may be of a solid type, gel type, or a liquid type electrolyte.

The counter substrate 120 facing the light receiving substrate 110 is not necessarily transparent. However, in order to increase photoelectric conversion efficiency, the counter substrate 120 may be made out of a transparent material so as to receive light VL on both sides of the photoelectric conversion device, and may be made out of the same material as that of the light receiving substrate 110. In particular, when the photoelectric conversion device is installed as a building integrated photovoltaic system in a structure, e.g., a window frame, both sides of the photoelectric conversion device may be transparent so that light VL is not blocked and can enter the photoelectric conversion device.

The counter electrode 124 may include a transparent conductive layer 121 and a catalyst layer 122 arranged on the transparent conductive layer 121. The transparent conductive layer 121 may be made out of a material having transparency and electrical conductivity, for example a transparent conductive oxide such as ITO, FTO, or ATO. The catalyst layer 122 may be made out of a reduction catalyzing material for providing electrons to the electrolyte 150, for example a metal such as platinum (Pt), gold (Ag), silver (Au), copper (Cu), or aluminum (Al), a metal oxide such as a tin oxide, or a carbon-based material such as graphite.

The counter electrode 124 functions as a positive electrode for the photoelectric conversion device, and also as a reduction catalyst for providing electrons to the electrolyte 150. The photosensitive dye absorbed into the semiconductor layer 116 absorbs light VL to excite electrons, and the excited electrons are discharged to the outside of the photoelectric conversion device through the photoelectrode 114. The photosensitive dye losing electrons to photoelectrode 114 also receives electrons generated by oxidization of the electrolyte 150 to be reduced again, and the oxidized electrolyte 150 is reduced again by electrons passing through the external circuit 180 and reaching the counter electrode 124, thereby completing the operation of the photoelectric conversion device.

Meanwhile, a grid electrode may be also arranged in the counter electrode 124. More specifically, the grid electrode 123 may be arranged on the catalyst layer 122. The grid electrode 123 is used to reduce an electrical resistance of the counter electrode 124. The grid electrode 123 provides a current path having a low resistance for receiving electrons passing through the external circuit 180 and reaching the counter electrode 124 and for providing the electrons to the electrolyte 150. For example, the grid electrode 123 may be made out of a metal material having a high electrical conductivity, such as gold (Ag), silver (Au), or aluminum (Al), and may be patterned in a stripe pattern or a mesh pattern.

A protective layer 125 may be further arranged on an outer surface of the grid electrode 124. The protective layer 125 prevents the grid electrode 124 from being damaged by erosion if the grid electrode 123 were to contact and react with the electrolyte 150. The protective layer 125 may be made out of a material that does not react with the electrolyte 150, such as a curable resin material.

Figure 3:
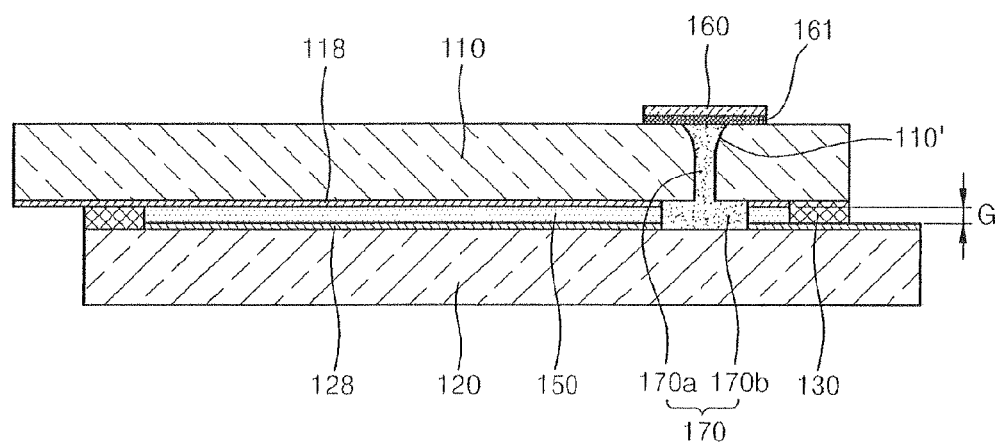
FIG. 3 is a cross-sectional view taken along a line of FIG. 1 for describing a sealing structure of an electrolyte injecting aperture.

FIG. 3 is a cross-sectional view taken along a line of FIG. 1 and describes a sealing structure of the electrolyte injecting aperture 110' according to the first embodiment of the present invention. The sealing member 130 is arranged along edges of the light receiving substrate 110 and the counter substrate 120 to attach the light receiving substrate 110 to the counter substrate 120. Sealing member 130 is cured by applying a predetermined pressure and heat thereon, resulting in a gap G of a predetermined distance between the light receiving substrate 110 and the counter substrate 120. The space between the light receiving substrate 110 and the counter substrate 120 corresponding to substrate gap G is filled with electrolyte 150. In the present invention, the light receiving substrate 110 may include the electrolyte injecting aperture 110' to provide an injection path for the electrolyte 150. The electrolyte injecting aperture 110' is arranged to penetrate through the light receiving substrate 110 and is connected to the space between light receiving substrate 110 and the counter substrate 120 that corresponds to the substrate gap G. For example, the electrolyte injecting aperture 110' may have a cylindrical shape.

A water-absorbing filler 170 is used to fill the electrolyte injecting aperture 110'. The water-absorbing filler 170 absorbs water permeating from the outside, so that water is not allowed to enter the photoelectric conversion device. The water-absorbing filler 170 prevents entry of external substances while sealing the electrolyte 150 within so as to prevent the electrolyte 150 from volatilizing or leaking. The water-absorbing filler 170 may have a sufficient coating adhesion to prevent separation from a wall surface of the electrolyte injecting aperture 110'.

The water-absorbing filler 170 may include a water vapor absorption material to absorb water, and a resin base material that contains the water vapor absorption material and is capable of sealing an electrolyte solution. The water vapor absorption material may be a physical adsorption drying agent, a chemical adsorption drying agent, or a combination thereof. Since a physical adsorption drying agent can absorb water quickly, the water may be rapidly removed. The physical adsorption drying agent may be zeolite, silica gel, activated alumina, or activated carbon. On the other hand, since a chemical adsorption drying agent does not separate an absorbent material, water is not separated, even under a high operating temperature environment of the photoelectric conversion device. The chemical adsorption drying agent may be calcium oxide, calcium chloride, magnesium sulfate, barium oxide, phosphorus pentoxide, potassium hydroxide, sodium hydroxide, potassium bromide, calcium bromide, copper sulfate, zinc chloride, calcium sulfate, or magnesium oxide.

The resin base material containing the water vapor absorption material may be a material that seals and has a mobility that varies with temperature. For example, the resin base material may have a sufficient mobility to allow for injection into the space between light receiving substrate 110 and the counter substrate 120 that corresponds to the substrate gap G under a high temperature environment while being harden in a general operating temperature range of the photoelectric conversion device to seal the electrolyte injecting aperture 110'. After the injection of the electrolyte 150 is finished, the high temperature water-absorbing filler 170 is injected into the electrolyte injecting aperture 110' through a predetermined pressurizing device such as a syringe. The water-absorbing filler 170 is then cooled so that it hardens and firmly attaches to an inner wall surface of the electrolyte injecting aperture 110'.

In general, since the photoelectric conversion device is operated in a temperature range of from about 50° C. to about 80° C., the resin base material may include a material having mobility in a temperature range of about 80° C. to about 180°

C. In more detail, the resin base material may include an acrylic resin, an epoxide-based resin, a silicon-based resin, an olefin resin, an olefin-acrylic acid-based resin, an acrylic acid-based resin including olefin-metal ion, an olefin-acrylate-based resin, etc. However, the resin base material may be a temperature-sensitized material having different mobilities according to a temperature environment or a photosensitized material having different mobilities according to light irradiation.

The water-absorbing filler 170 filled within the electrolyte injecting aperture 110' may extend into the space between light receiving substrate 110 and the counter substrate 120 that corresponds to the substrate gap G. That is, the water-absorbing filler 170 has a rivet shape ("⊥") including a first portion 170a filled in the electrolyte injecting aperture 110' and a second portion 170b extending from the first portion 170a and into the space between light receiving substrate 110 and the counter substrate 120 that corresponds to the substrate gap G. The first portion 170a and the second portion 170b of the water-absorbing filler 170 respectively seal the electrolyte injecting aperture 110' and a portion of the space between light receiving substrate 110 and the counter substrate 120 that corresponds to the substrate gap G so as to prevent the electrolyte 150 from leaking. The entire length of the water-absorbing filler 170 extends from the electrolyte injecting aperture 110' and into the space between light receiving substrate 110 and the counter substrate 120 that corresponds to the substrate gap G, and thus a sealing property of the electrolyte 150 may be increased. In particular, as the water-absorbing filler 170 extends into the space between light receiving substrate 110 and the counter substrate 120 that corresponds to the substrate gap G, an adhesion area of the water-absorbing filler 170 is enlarged, and thus an adhesion strength of the water-absorbing filler 170 is enhanced, thereby effectively preventing the electrolyte 150 from leaking.

Figure 4:
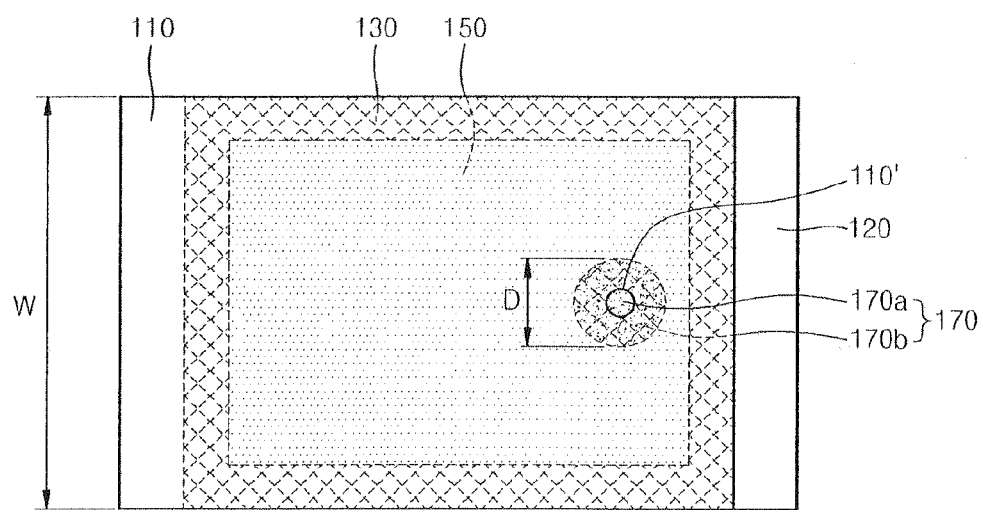
FIG. 4 is a plane view illustrating the sealing structure of the electrolyte injecting aperture of FIG. 3 seen from above.

Turning now to FIG. 4, FIG. 4 is a top view illustrating a sealing structure of the electrolyte injecting aperture 110' of FIG. 3. Referring to FIG. 4, the first portion 170a of the water-absorbing filler 170 has a cylindrical shape and fills the electrolyte injecting aperture 110', and the second portion 170b of the water-absorbing filler 170 may be roughly disk-shaped. In this instance, the second portion 170b may have a diameter D less than a width W of the light receiving substrate 110 so that the second portion 170b does not divide the electrolyte 150 and allows the electrolyte 150 to circulate. The second portion 170b of the water-absorbing filler 170 forms a relatively wide adhesion area between the light receiving substrate 110 and the counter substrate 120, thereby obtaining a high adhesive strength.

The electrolyte injecting aperture 110' is sealed by a cap member 160. The cap member 160 may be made out of a material that does not allow for the penetration of oxygen and water. For example, the cap member 160 may be a glass substrate or a thin metal substrate. The cap member 160 may be attached to surround the electrolyte injecting aperture 110' on the light receiving substrate 110 by interposing a contacting layer 161 between the cap member 160 and the electrolyte injecting aperture 110'. The contacting layer 161 may be a resin-based film, such as an ionomer resin or a reformed polyolefin resin. The contacting layer 161 may also be a thermal fusion film that attaches the cap member 160 to the light receiving substrate 110 upon application of pressure and heat. The cap member 160 and the water-absorbing filler 170 arranged within the electrolyte injecting aperture 110' form a double sealing structure, thereby effectively preventing the electrolyte 150 from leaking out.

Figure 5:
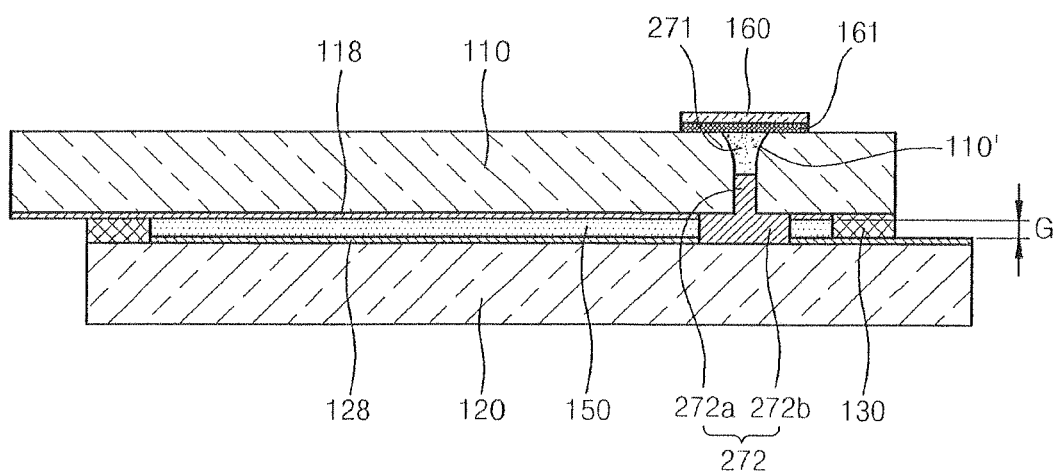
FIG. 5 is a cross-sectional view for describing a sealing structure of an electrolyte injecting aperture according to a second embodiment of the present invention.

Turning now to FIG. 5, FIG. 5 is a cross-sectional view for describing a sealing structure of an electrolyte injecting aperture 110' according to a second embodiment of the present invention. Referring to FIG. 5, fillers 271 and 272 fill electrolyte injecting aperture 110' and extend into the space between light receiving substrate 110 and the counter substrate 120 that corresponds to the substrate gap G. The fillers 271 and 272 block external harmful substances from entering the photoelectric conversion device and prevent electrolyte 150 from volatilizing and leaking from the photoelectric conversion device. The fillers 271 and 272 may be respectively referred to as a first filler 271 arranged in a portion of the electrolyte injecting aperture 110' furthest from counter substrate 120 and a second filler 272 that is connected to the first filler 271 and extends into the space between light receiving substrate 110 and the counter substrate 120 that corresponds to the substrate gap G. That is, the second filler 272 may have a rivet shape ("⊥") and include a first portion 272a arranged within the electrolyte injecting aperture 110' and a second portion 272h extending from the first portion 272a and into the space between light receiving substrate 110 and the counter substrate 120 that corresponds to the substrate gap G. The first and second fillers 271 and 272 seal the electrolyte injecting aperture 110' and the space between light receiving substrate 110 and the counter substrate 120 that corresponds to the substrate gap G so as to prevent the electrolyte 150 from leaking.

The first and second fillers 271 and 272 may be respectively made out of materials each having a different property. The second filler 272 may be located adjacent to the electrolyte 150 and may seal the electrolyte 150 so as to prevent the electrolyte 150 from volatilizing and leaking. The second filler 272 may be made out of a material that may seal the electrolyte 150, such as a resin material including an acrylic resin, an epoxide-based resin, a silicon-based resin, an olefinic resin, an olefin-acrylic acid-based resin, an acrylic acid-based resin including olefin-metal ion, an olefin-acrylate-based resin, etc. For example, the second filler 272 may have a sufficient mobility at high temperature to allow it to be injected into the electrolyte injecting aperture 110' and into the space between light receiving substrate 110 and the counter substrate 120 that corresponds to the substrate gap G. However, the second filler 272 may also be made out of a material that is hardened under a general operating temperature of the photoelectric conversion device to seal the electrolyte injecting aperture 110' within. For example, since the photoelectric conversion device is generally operated in a temperature range of from about 50° C. to about 80° C., the second filler 272 may include a material having mobility in a temperature range of from about 80° C. to about 180° C. The second filler 272 is injected into the electrolyte injecting aperture 110' using a predetermined pressurizing device. The second filler 272 is pushed up to a lower portion of the electrolyte injecting aperture 110' so that the first filler 271 may be formed thereon.

The first filler 271 is adhesive with respect to the sidewall surfaces of the electrolyte injecting aperture 110' to prevent moisture or oxygen from entering the photoelectric conversion device while preventing the electrolyte solution 150 from leaking. In particular, the first filler 271 absorbs water permeating from the outside so that the water does not enter the photoelectric conversion device. The first filler 271 may include a water vapor absorption material having water absorbability and a resin base material containing the water vapor absorption material. The resin base material prevents moisture and water from entering the photoelectric conversion device while sealing the electrolyte 150 within.

The water vapor absorption material may be a physical adsorption drying agent, a chemical adsorption drying agent, or a combination thereof. The physical adsorption drying agent may be zeolite, silica gel, activated alumina, or activated carbon, and the chemical adsorption drying agent may be calcium oxide, calcium chloride, magnesium sulfate, barium oxide, phosphorus pentoxide, potassium hydroxide, sodium hydroxide, potassium bromide, calcium bromide, copper sulfate, zinc chloride, calcium sulfate, or magnesium oxide.

The resin base material including the water vapor absorption material may be made out of a material that seals the electrolyte 150 within and has mobility that varies according to temperature. For example, the resin base material may be made out of a material similar to the second filler 272, for example, a material including an acrylic resin, an epoxide-based resin, a silicon-based resin, an olefin resin, an olefin-acrylic acid-based resin, an acrylic acid-based resin including olefin-metal ion, an olefin-acrylate-based resin, etc.

The electrolyte injecting aperture 110' may be sealed by the cap member 160. The cap member 160 may be made out of a material that does not allow external moisture or oxygen to enter the device, such as a glass substrate or a thin metal substrate. The cap member 160 may be attached to surround the electrolyte injecting aperture 110' on the light receiving substrate 110 by interposing a contacting layer 161 between the cap member 160 and the electrolyte injecting aperture 110'. The contacting layer 161 may be a resin-based film, for example, an ionomer resin or a reformed polyolefin resin.

Figure 6A:
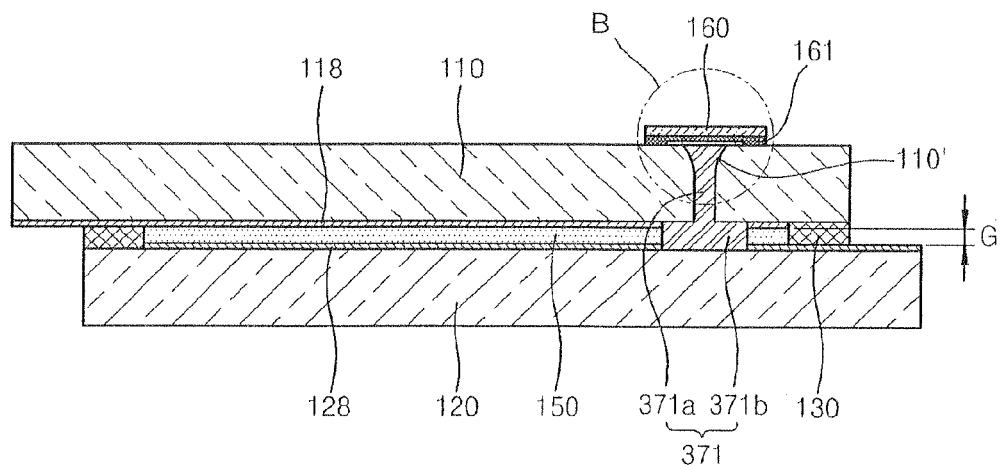
FIG. 6A is a cross-sectional view for describing a sealing structure of an electrolyte injecting aperture according to a third embodiment of the present invention.
Figure 6B:
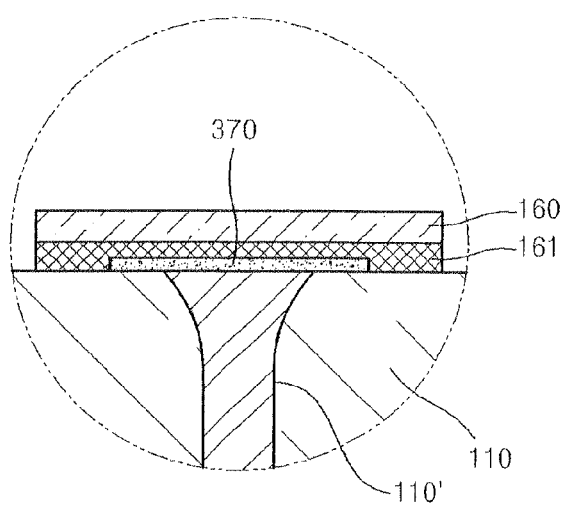
FIG. 6B is an enlarged view of part B of FIG. 6A.

Turning now to FIGS. 6A and 6B, FIG. 6A is a cross-sectional view for describing a sealing structure of an electrolyte injecting aperture according to a third embodiment of the present invention and FIG. 6B is an enlarged view of part B of FIG. 6A. Referring to FIGS. 6A and 6B, a filler 371 fills in an electrolyte injecting aperture 110' and extends into the space between light receiving substrate 110 and the counter substrate 120 that corresponds to the substrate gap G. The filler 371 does not allow external moisture or oxygen to penetrate into the photoelectric conversion device and prevents electrolyte 150 from volatilizing or leaking to an outside. The filler 371 has a rivet shape ("⊥") that includes a first portion 371a arranged within the electrolyte injecting aperture 110' and a second portion 371b extending from the first portion 371a and into the space between light receiving substrate 110 and the counter substrate 120 that corresponds to the substrate gap G. The first portion 371a and the second portion 371b of the filler 371 respectively seal the electrolyte injecting aperture 110' within the space between light receiving substrate 110 and the counter substrate 120 that corresponds to the substrate gap G to prevent the electrolyte 150 from leaking. As the filler 371 extends into the space between light receiving substrate 110 and the counter substrate 120 that corresponds to the substrate gap G, an adhesion area of the filler 371 is enlarged, and thus an adhesion strength of the filler 371 is enhanced, thereby effectively preventing the electrolyte 150 from leaking.

The filler 371 may be made out of a material that seals electrolyte 150 within, such as a resin material such as an acrylic resin, an epoxide-based resin, a silicon-based resin, an olefin resin, an olefin-acrylic acid-based resin, an acrylic acid-based resin including olefin-metal ion, an olefin-acrylate-based resin, etc. The electrolyte injecting aperture 110' may further be sealed by a cap member 160. The cap member 160 may be made out of a material that prevents external water and oxygen from entering the photoelectric conversion device, such as a glass substrate or a thin metal substrate. The cap member 160 may be attached to surround the electrolyte injecting aperture 110' on the light receiving substrate 110 by interposing a contacting layer 161 between the cap member 160 and the electrolyte injecting aperture 110'.

Referring now to FIG. 6B, a water-absorbing sealing layer 370 may also be arranged adjacent to an inlet of the electrolyte injecting aperture 110' and between the contacting layer 161 and the light receiving substrate 110. The water-absorbing sealing layer 370 absorbs water in the inlet of the electrolyte injecting aperture 110' so as to prevent water from entering the space between light receiving substrate 110 and the counter substrate 120 that corresponds to the substrate gap G. The water-absorbing sealing layer 370 may include a water vapor absorption material having water absorbability and a resin base material containing the water vapor absorption material. The resin base material seals the inlet of the electrolyte injecting aperture 110' so as to prevent external water and oxygen from permeating into the photoelectric conversion device. The water vapor absorption material may be a physical adsorption drying agent, a chemical adsorption drying agent, or a combination thereof. The physical adsorption drying agent may be zeolite, silica gel, activated alumina, or activated carbon. The chemical adsorption drying agent may be calcium oxide, calcium chloride, magnesium sulfate, barium oxide, phosphorus pentoxide, potassium hydroxide, sodium hydroxide, potassium bromide, calcium bromide, copper sulfate, zinc chloride, calcium sulfate, or magnesium oxide.

The resin base material containing the water vapor absorption material may be a material that seals the inlet of the electrolyte injecting aperture 110'. For example, the resin base material may have mobility at a high temperature that allows the resin base material to be coated onto the inlet of the electrolyte injecting aperture 110' and around the electrolyte injecting aperture 110' while having a lesser mobility at a lower temperature so that the resin base material may harden under a general operating temperature of the photoelectric conversion device to seal the electrolyte injecting aperture 110' from an outside. For example, the resin base material may include an acrylic resin, an epoxide-based resin, a silicon-based resin, an olefinic resin, an olefin-acrylic acid-based resin, an acrylic acid-based resin including olefin-metal ion, an olefin-acrylate-based resin, etc.

The cap member 160 is attached onto the water-absorbing sealing layer 370 by interposing a contacting layer 161 therebetween. For example, the contacting layer 161 may be extensively formed so as to cover and surround the water-absorbing sealing layer 370.

Figure 7A:
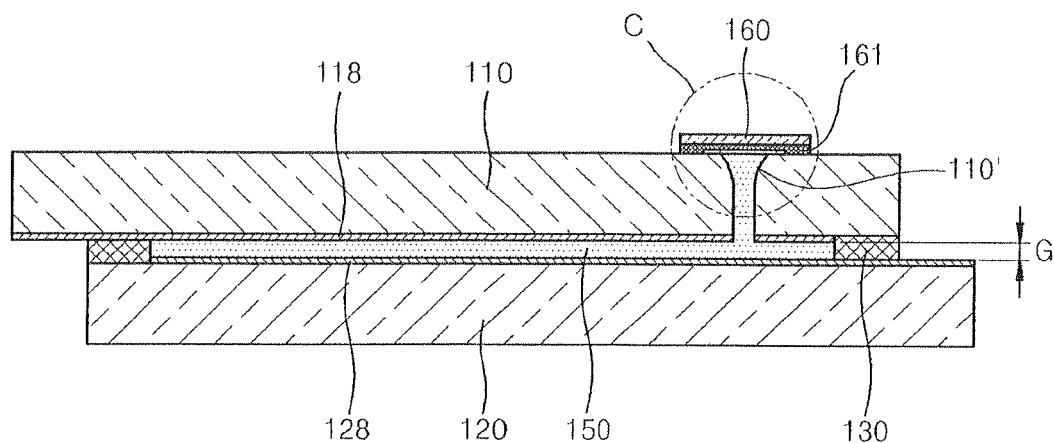
FIG. 7A is a cross-sectional view for describing a sealing structure of an electrolyte injecting aperture according to a fourth embodiment of the present invention.
Figure 7B:
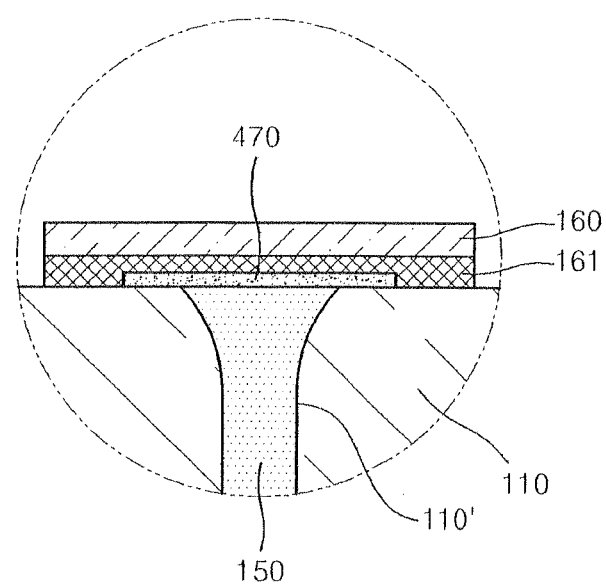
FIG. 7B is an enlarged view of part C of FIG. 7A.

Turning now to FIGS. 7A and 7B, FIG. 7A is a cross-sectional view for describing a sealing structure of an electrolyte injecting aperture 110' according to a fourth embodiment of the present invention and FIG. 7B is an enlarged view of part C of FIG. 7A. Referring to FIGS. 7A and 7B, an electrolyte 150 is filled within the space between light receiving substrate 110 and the counter substrate 120 that corresponds to the substrate gap G and also within electrolyte injecting aperture 110'. The electrolyte injecting aperture 110' is sealed by a cap member 160. A cap member 160 may be made out of a material that prevents external water or oxygen from entering the photoelectric conversion device. A water-absorbing sealing layer 470 and a contacting layer 161 are interposed between the cap member 160 and the electrolyte injecting aperture 110'. For example, the water-absorbing sealing layer 470 may be arranged adjacent to an inlet of the electrolyte injecting aperture 110', and may include a water vapor absorption material having water absorbability properties and a resin base material having sealing properties with respect to an electrolyte 150.

The water vapor absorption material may be a physical adsorption drying agent, a chemical adsorption drying agent, or a combination thereof. The physical adsorption drying agent may be zeolite, silica gel, activated alumina, or activated carbon. The chemical adsorption drying agent may be calcium oxide, calcium chloride, magnesium sulfate, barium oxide, phosphorus pentoxide, potassium hydroxide, sodium hydroxide, potassium bromide, calcium bromide, copper sulfate, zinc chloride, calcium sulfate, or magnesium oxide.

The resin base material including the water vapor absorption material may be a material that seals the electrolyte 150 within the photoelectric conversion device. For example, the resin base material may have a mobility that varies with temperature so that the resin base material may be coated onto the inlet of the electrolyte injecting aperture 110' and around the electrolyte injecting aperture 110' under a high temperature environment while being hardened under a general operating temperature of the photoelectric conversion device to seal the inlet of the electrolyte injecting aperture 110'. For example, the resin base material may include an acrylic resin, an epoxide-based resin, a silicon-based resin, an olefinic resin, an olefin-acrylic acid-based resin, an acrylic acid-based resin including olefin-metal ion, an olefin-acrylate-based resin, etc.

The cap member 160 is attached onto the water-absorbing sealing layer 470 by interposing the contacting layer 161 therebetween. For example, the contacting layer 161 may be extensively formed so as to cover and surround the water-absorbing sealing layer 470.

Meanwhile, a structure in which an electrolyte injecting aperture is arranged in a light receiving substrate has been described above. However, the electrolyte injecting aperture may instead be formed in a counter substrate facing the light receiving substrate, and in this instance, the aforementioned sealing structure may be applied in the same or similar way.

Figure 8A:
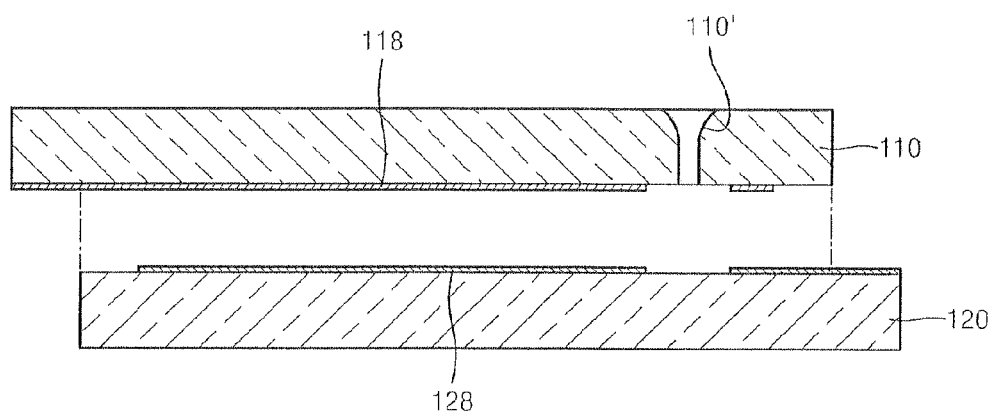
FIGS. 8A through 8H are cross-sectional views for explaining a method of manufacturing the photoelectric conversion device of FIG. 3.

Turning now to FIGS. 8A through 8H, FIGS. 8A through 8H are cross-sectional views for explaining a method of manufacturing the photoelectric conversion device of FIG. 3. First, the light receiving substrate 110 on which the functional layer 118 is arranged and the counter substrate 120 on which the functional layer 128 is arranged are prepared (FIG. 8A). The functional layer 118 includes a semiconductor layer 116 that receives light and generates electrons and a photoelectrode 114 that collects and discharging the generated electrons. The functional layer 128 includes a grid electrode 123 arranged on a catalyst layer 122. In particular, the electrolyte injecting aperture 110' for injecting the electrolyte is arranged in at least one of the light receiving substrate 110 and the counter substrate 120.

Figure 8B:
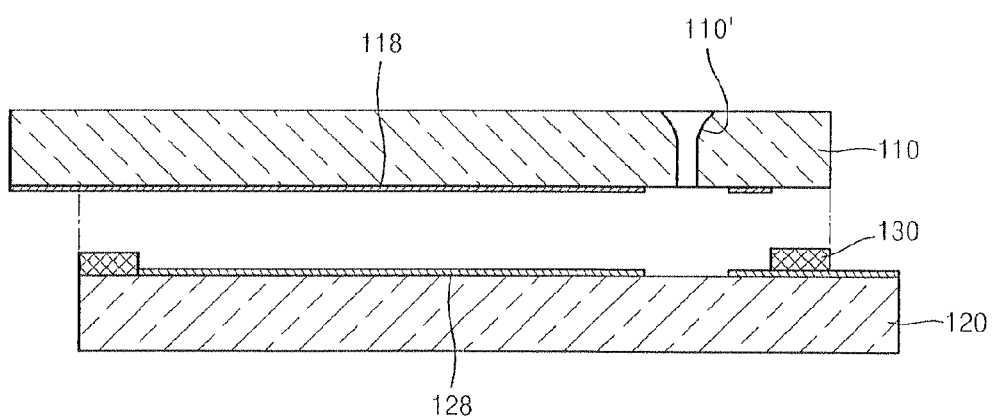
Figure 8C:
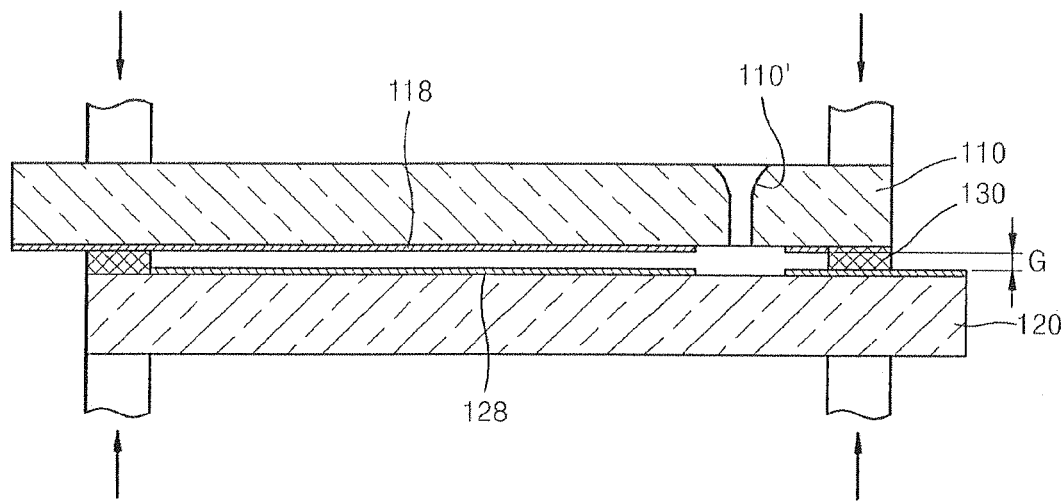

Next, the light receiving substrate 110 and the counter substrate 120 are arranged to face each other. The sealing member 130 is disposed along edges of the light receiving substrate 110 and the counter substrate 120 (FIG. 8B). For example, the sealing member 130 may be a thermal fusion film, and the thermal fusion film may be disposed along the edge of the counter substrate 120. Then, a predetermined heat and pressure are applied to attach the light receiving substrate 110 to the counter substrate 120, thereby forming a space between the two substrates that corresponds to the substrate gap G in which the electrolyte 150 will be filled (FIG. 8C).

Figure 8D:
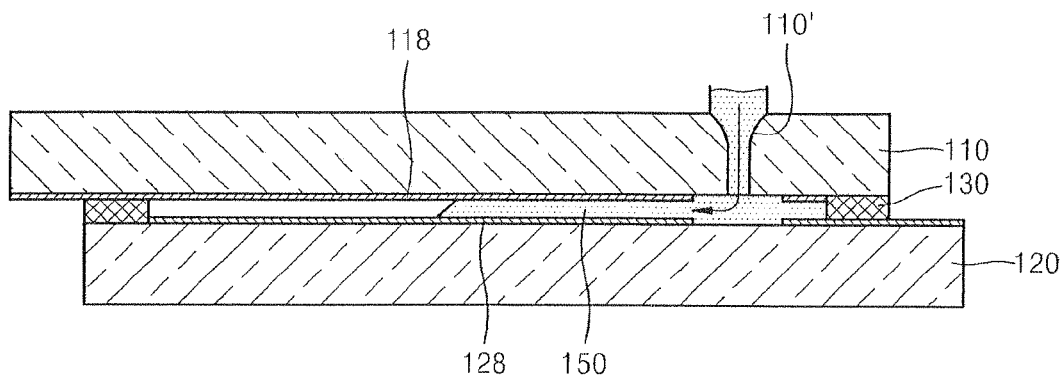
Figure 8E:
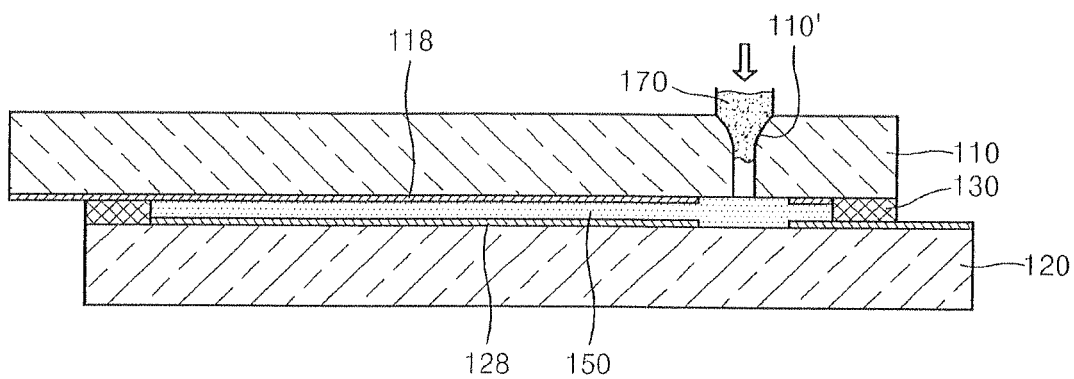
Figure 8F:
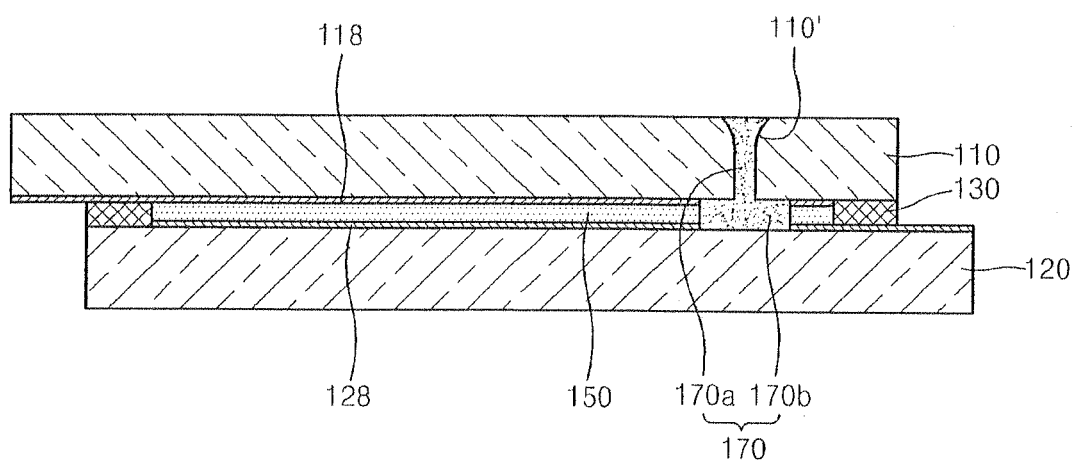

Next, the electrolyte 150 passing through the electrolyte injecting aperture 110' is filled within the space between the two substrates that corresponds to the substrate gap G by applying a predetermined pressure (FIG. 8D). Then, the water-absorbing filler 170 is injected into the electrolyte injecting aperture 110' by using a predetermined pressurizing device such as a syringe (FIG. 8E). The electrolyte injecting aperture 110' is sealed through a hardening process of the water-absorbing filler 170 by allowing the water-absorbing filler 170 to cool (FIG. 8F). For example, the water-absorbing filler 170 may fill the electrolyte injecting aperture 110' and extend into a space between the two substrates that corresponds to the substrate gap G by controlling mobility of the water-absorbing filler 170 and/or an applied pressure. If necessary, a process for removing surplus water-absorbing filler 170 remaining on the light receiving substrate 110 may be performed.

Figure 8G:
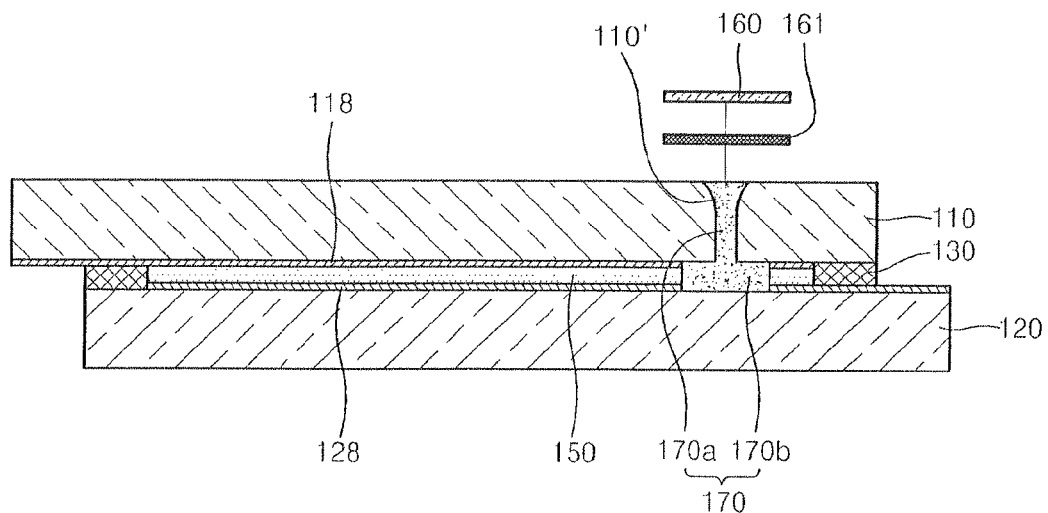
Figure 8H:
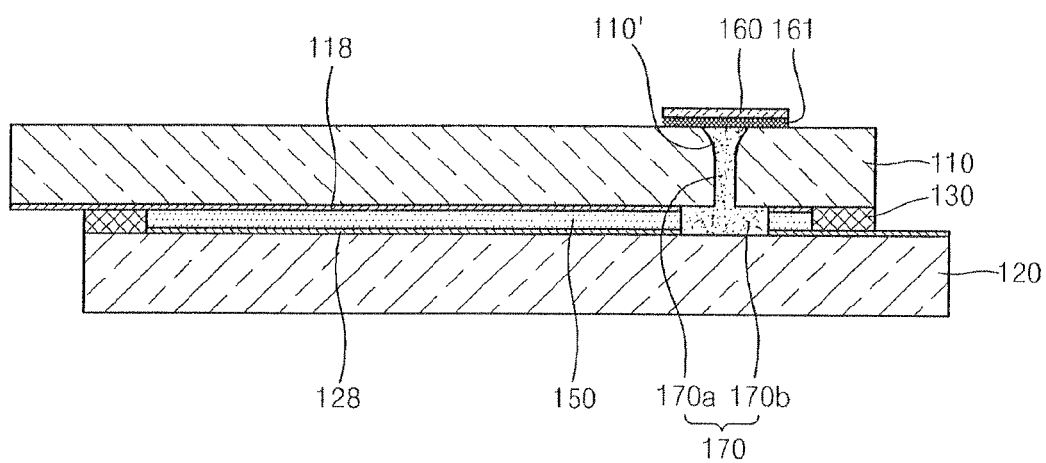

Next, the electrolyte injecting aperture 110' is sealed using the cap member 160 (FIGS. 8G and 8H). For example, the cap member 160 may be attached to surround the electrolyte injecting aperture 110' on the light receiving substrate 110 by interposing the contacting layer 161 between the cap member 160 and the electrolyte injecting aperture 110'. The contacting layer 161 may be a thermal fusion film and may be used to attach, under predetermined pressure and temperature conditions, the cap member 160 to the light receiving substrate 110 so that the cap member 160 surrounds the electrolyte injecting aperture 110'.

According to an embodiment of the present invention, a photoelectric conversion device having excellent durability is provided. In more detail, a filler is injected into an electrolyte injecting aperture so as to prevent external oxygen or water from entering the photoelectric conversion device and to effectively prevent an electrolyte arranged within the photoelectric conversion device from deteriorating or leaking. Also, a cap member, in conjunction with the filler seals an electrolyte injecting aperture and thus a double sealing structure is realized, thereby increasing the sealing characteristics of the photoelectric conversion device. In particular, the sealing structure for sealing the electrolyte injecting aperture has a water-absorbing function so as to prevent external oxygen and moisture from entering the photoelectric conversion device while preventing the electrolyte within the photoelectric conversion device from deteriorating.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A photoelectric conversion device, comprising:
   a first substrate and a second substrate facing each other and having a space between the first substrate and the second substrate, the first substrate comprising a flat outer surface facing away the second substrate and a flat inner surface facing towards the second substrate, the second substrate comprising a flat outer surface facing away the first substrate and a flat inner surface facing towards the first substrate, the space having a thickness corresponding to a distance between the first and second substrates;
   a first electrode being arranged on the first substrate, the first electrode comprising a transparent conductive layer formed of a first material and a conductive grid electrode formed of a second material disposed on the transparent conductive layer and a semiconductor layer formed of a third material disposed on the grid electrode, with the first, second and third material being different from each other;
   a second electrode being arranged on the second substrate;
   an electrolyte arranged within the space between the first substrate and the second substrate;

an electrolyte injecting aperture arranged on the first substrate to inject said electrolyte into said space; and a sealing structure sealing the electrolyte injecting aperture, the sealing structure comprising a water vapor absorption material to absorb water, the sealing structure comprising a first portion disposed within the electrolyte injecting aperture and a second portion disposed in the space between the first and second substrates, the second portion radially extending from an end of the first portion, a thickness of the second portion of the sealing structure being equal to the thickness of the space, the sealing structure protruding from the outer surface of the first substrate towards an exterior of the photoelectric conversion device, the sealing structure protruding from the inner surface of the first substrate and terminating at the inner surface of the second substrate.

2. The photoelectric conversion device of claim 1, the sealing structure further comprising a filler to fill the electrolyte injecting aperture in a thickness direction of the first substrate.

3. The photoelectric conversion device of claim 2, wherein the filler extends from the electrolyte injecting aperture into the space between the first substrate and the second substrate.

4. The photoelectric conversion device of claim 3, wherein the filler has a rivet shaped cross-section.

5. The photoelectric conversion device of claim 1, wherein the sealing structure further comprises a resin base material to contain the water vapor absorption material.

6. The photoelectric conversion device of claim 5, wherein the water vapor absorption material comprises at least one of a physical adsorption drying agent and a chemical adsorption drying agent.

7. The photoelectric conversion device of claim 5, wherein the resin base material has mobility in a temperature range of 80° C. to 180° C.

8. The photoelectric conversion device of claim 1, wherein the sealing structure further comprises first and second fillers that are respectively comprised of different materials, the first and second fillers fill upper and lower portions respectively of the electrolyte injecting aperture in a thickness direction of the first substrate.

9. The photoelectric conversion device of claim 8, wherein the first filler further comprises a resin base material that contains the water vapor absorption material.

10. The photoelectric conversion device of claim 8, wherein the second filler extends from the lower portion of the electrolyte injecting aperture into the space between the first and second substrates.

11. The photoelectric conversion device of claim 10, wherein the second filler has a rivet shaped cross-section.

12. The photoelectric conversion device of claim 1, further comprising a cap member attached to the first substrate and covering an upper portion of the electrolyte injecting aperture.

13. The photoelectric conversion device of claim 1, wherein the sealing structure further comprises a sealing layer arranged on the first substrate and covering an upper portion of the electrolyte injecting aperture.

14. The photoelectric conversion device of claim 13, further comprising:

a cap member; and
a contacting layer arranged between the cap member and the sealing layer to attach the cap member to the sealing layer.

15. The photoelectric conversion device of claim 14, wherein the contacting layer is arranged over a region on the first substrate that covers and surrounds the sealing layer.

16. The photoelectric conversion device of claim 1, the sealing structure further comprising:

a filler to fill the electrolyte injecting aperture in a thickness direction of the first substrate; and
a sealing layer covering an upper portion of the electrolyte injecting aperture.

17. The photoelectric conversion device of claim 16, wherein at least one of the filler and the sealing layer comprises the water vapor absorption material.

18. A photoelectric conversion device, comprising:

a light receiving substrate having a photoelectrode arranged thereon, the photoelectrode comprising a transparent conductive layer formed of a first material and a conductive grid electrode formed of a second material disposed on the transparent conductive layer and a semiconductor layer formed of a third material disposed on the grid electrode, with the first, second and third material being different from each other;

a counter substrate facing the light receiving substrate, a counter electrode being arranged on the counter substrate, the light receiving substrate comprising a flat outer surface facing away the counter substrate and a flat inner surface facing towards the counter substrate, the counter substrate comprising a flat outer surface facing away the light receiving substrate and a flat inner surface facing towards the light receiving substrate;

an electrolyte arranged in a space between the light receiving substrate and the counter substrate, the space having a thickness corresponding to a distance between the light receiving substrate and counter substrates;

an electrolyte injecting aperture arranged in a thickness direction of the light receiving substrate to inject said electrolyte; and a water-absorbing filler arranged within the electrolyte injecting aperture to seal the electrolyte within the space between the light receiving substrate and the counter substrate, wherein the water-absorbing filler includes a water vapor absorption material to absorb water and a resin base material that contains the water vapor absorption material, the water-absorbing filler comprising a first portion disposed within the electrolyte injecting aperture and a second portion disposed in the space between the light receiving substrate and counter substrates, the second portion radially extending from an end of the first portion, a thickness of the second portion of the sealing structure being equal to the thickness of the space, the filler protruding from the outer surface of the light receiving substrate towards an exterior of the photoelectric conversion device, the filler protruding from the inner surface of the light receiving substrate and terminating at the inner surface of the counter substrate.

* * * * *